United States Patent [19]

Rundo

[11] Patent Number: 5,045,146
[45] Date of Patent: Sep. 3, 1991

[54] TAPE APPLICATOR WITH CORNER FORMING DEVICE

[75] Inventor: John R. Rundo, Strongsville, Ohio
[73] Assignee: Tremco, Inc., Beachwood, Ohio
[21] Appl. No.: 363,510
[22] Filed: Jun. 8, 1989
[51] Int. Cl.$^5$ ............................................. B32B 31/00
[52] U.S. Cl. ................................... 156/391; 156/523; 156/545; 156/552; 156/574; 156/579
[58] Field of Search ............... 156/107, 391, 523, 574, 156/577, 579, 522, 542, 545, 552

[56] References Cited

U.S. PATENT DOCUMENTS

| | | |
|---|---|---|
| Re. 24,937 | 2/1961 | Lea . |
| 2,916,079 | 12/1959 | Schiefer ............................ 154/1.8 |
| 3,037,898 | 6/1962 | Zumofen . |
| 3,391,805 | 7/1968 | Baden . |
| 3,730,815 | 5/1973 | Terzian ............................ 156/527 |
| 3,733,237 | 5/1973 | Wolff . |
| 3,876,489 | 4/1975 | Chenel . |
| 3,886,013 | 5/1975 | Bowser et al. . |
| 3,951,727 | 4/1976 | Greenberg . |
| 4,088,522 | 5/1978 | Mercier et al. . |
| 4,174,246 | 11/1979 | Ralston ........................... 156/522 X |
| 4,295,920 | 10/1981 | Bovone . |
| 4,356,614 | 11/1982 | Käuferle et al. . |
| 4,434,024 | 2/1984 | Lisec . |
| 4,466,847 | 8/1984 | Held . |
| 4,495,023 | 1/1985 | Lisec . |
| 4,519,962 | 5/1985 | Schlienkamp . |
| 4,561,929 | 12/1985 | Lenhardt . |
| 4,600,466 | 7/1986 | Herrmann ........................ 156/391 |
| 4,623,421 | 11/1986 | Cardin ............................. 156/523 |
| 4,666,539 | 5/1987 | Karzmer . |
| 4,699,686 | 10/1987 | Franke ............................ 156/579 |
| 4,756,789 | 7/1988 | Kolff .............................. 156/391 |
| 4,759,810 | 7/1988 | Jackson et al. . |
| 4,769,105 | 9/1988 | Lisec . |
| 4,849,063 | 7/1989 | McXinnon . |

FOREIGN PATENT DOCUMENTS 1234682 4/1988 Canada .
0293302 11/1988 European Pat. Off. .
8600068.3 2/1986 Fed. Rep. of Germany .

OTHER PUBLICATIONS

Copending U.S. Patent Application Ser. No. 07/409,717.
"Notice Technique-Ligne Double Vitrage," Societe Atlantique de Materiels Appliques a la Production (Mar. 1987).
"Tous Vitrages Isolants" (Sep. 1986).
"Swiggle Strip For Insulating Glass," Tremco Ltd. (date unknown).
Photographs of Muntin Alignment Table of Product Design & Development of York, Pa.
Photograpsh of hand-held insulating strip applicator of Quelen of France.
Photographs of applicator device of La Fond, Inc. of Quebec, Canada.
Photographs of hand-held applicator of La Fond, Inc. of Quebec, Canada.

Primary Examiner—David A. Simmons
Assistant Examiner—James J. Engel, Jr.
Attorney, Agent, or Firm—Willian Brinks Olds Hofer Gilson & Lione

[57] ABSTRACT

An applicator tool for use in applying an insulating strip on the surface of a window pane used in the assembly of multi-pane windows. The applicator tool includes a directing roller which directs the insulating strip onto the glass while maintaining only rolling contact with the surface of the glass. The directing roller is removable, is capable of adjustment in the vertical direction, and is capable of adjustment to vary the distance from the edge of the glass the insulating strip is placed. The applicator further includes two guiding rollers which maintain rolling contact with the edge of the glass. Transport rollers may be used on the applicator tool when insulating strip is applied to glass located on a flat surface. The tool also includes a rectangular block for use in molding the insulating strip around a corner.

17 Claims, 3 Drawing Sheets

TAPE APPLICATOR WITH CORNER FORMING DEVICE

BACKGROUND OF THE INVENTION

This invention relates to an apparatus for applying a flexible strip onto a planar surface. More particularly, the present invention relates to a new and improved apparatus for applying an insulating strip onto a pane of glass as part of the manufacturing process of multi-pane windows.

When manufacturing multi-pane windows, it is necessary to seal the space between the window panes such that the panes are maintained at a fixed separation and such that the accumulation of moisture between the panes is avoided. One product which is frequently used for this purpose is an insulating strip sold by Tremco, Inc. under the trade name SWIGGLE STRIP ®.

When manufacturing multi-pane windows, a piece of insulating strip is placed along the surface of one pane a predetermined distance from its edge. The second pane is then placed over the insulating strip such that the two panes are aligned and parallel to one another with the separation of the panes maintained by the insulating strip.

Until recently, the preferred method for applying the insulating strip to a pane of glass was to apply the insulating strip manually. This was found to be disadvantageous because of inconsistencies in the placement of the strip relative to the edge of the pane. An additional disadvantage was that extensive time was required for one to accurately apply the insulating strip.

As a result of the difficulties in manually applying the insulating strip, various devices have been developed in an attempt to facilitate the application process. One such device is disclosed in U.S. Pat. No. 4,756,789 to Kolff.

A problem which many such devices share is that they employ one or more parts which are designed to slide along the surface of the glass as the insulating strip is applied. Because many panes on which an insulating strip is applied are coated, a device which rubs along the surface of the glass has the potential of scratching or otherwise damaging these coatings.

An additional disadvantage associated with many prior art devices is that they are awkward to handle when molding the insulating strip to form a corner. When utilizing a prior art device to apply an insulating strip to the surface of a pane, the device is used only for applying the insulating strip in straight lines. Thus, the device is used to apply the insulating strip along one edge of a pane and it then must be placed aside while the worker manually molds the strip to "turn the corner." The worker then must take the device in hand to apply the strip along the next straight segment. Because most double-pane windows are rectangular in shape, the worker must set down and pick up the device at least four times in the course of applying an insulating strip to one window. During mass production of multi-pane windows, a substantial amount of time can be lost because of the extra motions required to repeatedly set down and pick up the applicator device.

Multi-pane windows come in a variety of thickness and a variety of insulating strips are employed in the construction of those windows. Many prior art applicators, however, are designed to work only with one thickness of insulating strip.

It will be appreciated, therefore, that what is needed for the art is a device in applying an insulating strip to a pane which does not risk damaging the pane. It would be an enhancement in the art if such a device could be employed in molding the insulating strip to form a corner, thereby preventing the worker from having to repeatedly set the device down and pick it up. Indeed, it would be a significant advancement in the art if such a device could be provided which could be adjusted for various thicknesses of windows and various heights of insulating strip.

Such a device for applying an insulating strip to a window is disclosed and claimed herein.

SUMMARY OF THE INVENTION

The present invention is directed to a novel device for applying an insulating strip to a window, such as is done when manufacturing multi-pane windows. The applicator includes a directing roller with a flange on each side through which the insulating strip is directed as the applicator is guided along the edge of the window.

The directing roller is the only roller or other surface of the tool which comes into contact with the surface of the glass as the insulating strip is directed onto the glass with the roller. Thus, any danger that the glass would be scratched or any coating on the glass damaged is virtually eliminated. The only contact with the surface of the glass is rolling contact, there is no sliding contact with the surface of the glass.

In one embodiment, the tool of the present invention additionally includes at least one transport roller configured such that it is in rolling connection with the table or other flat surface upon which the glass rests as the insulating strip is being applied.

The tool of the present invention further comprises at least one guide roller which is configured to roll along the edge of the glass to assist in applying the insulating strip on the surface of the glass a constant, predetermined distance from the edge of the glass.

In a preferred embodiment, the applicator tool is configured with a rectangular block attached to the handle of the tool to facilitate the molding of the insulating strip to correspond to the corners of the glass. The corner mold is used by the operator of the applicator when molding the insulating strip around a corner, thereby allowing the operator to "turn the corner" of the glass with the insulating strip without having to set the applicator tool aside.

The applicator roller is preferably eccentrically mounted onto the frame of the tool such that the tool may be adjusted for use with various thicknesses of glass. Additionally, the directing roller may quickly be removed from the tool and replaced with an alternate directing roller. Thus, a suitably sized roller may be employed depending on the size of the insulating strip to be utilized.

Advantageously, the tool of the present invention may also be configured such that the directing roller and the guide rollers may be mounted on either side of the tool. Thus, the tool may be quickly converted for use in either a right-handed mode or a left-handed mode.

In one embodiment of the invention, the directing roller also is configured with flanges of differing thicknesses. Thus, the directing roller may be utilized with either flange operating on the side of the edge of the glass depending on how far from the edge of the glass the user of the tool desires to attach the insulating strip. Thus, regardless of the thickness of insulating strip which is employed or the distance it is desired that the insulating strip be placed from the edge of the glass, the applicator tool may be quickly modified for use in applying a variety of sizes of insulating strip a variety of distances from the edge of the glass.

Thus, it is an object of the present invention to provide an insulating strip applicator which significantly reduces the risk of damaging the glass or glass coating as the insulating strip is applied to the glass surface.

It is a further object of the present invention to provide such an insulating strip applicator which can be used by the operator to assist in molding the insulating strip around a corner such that the operator does not have to set the applicator aside.

It is an additional object of the present invention to provide an applicator capable of use on various sizes of insulating strip and capable of adjustment to apply the insulating strip various distances from the edge of the window.

These and other objects and advantages of the present invention will become more fully apparent by examination of the following description of the preferred embodiments and the accompanying drawings.

DETAILED DESCRIPTION OF THE PREFERRED EMBODIMENTS OF THE INVENTION

Figure 1:
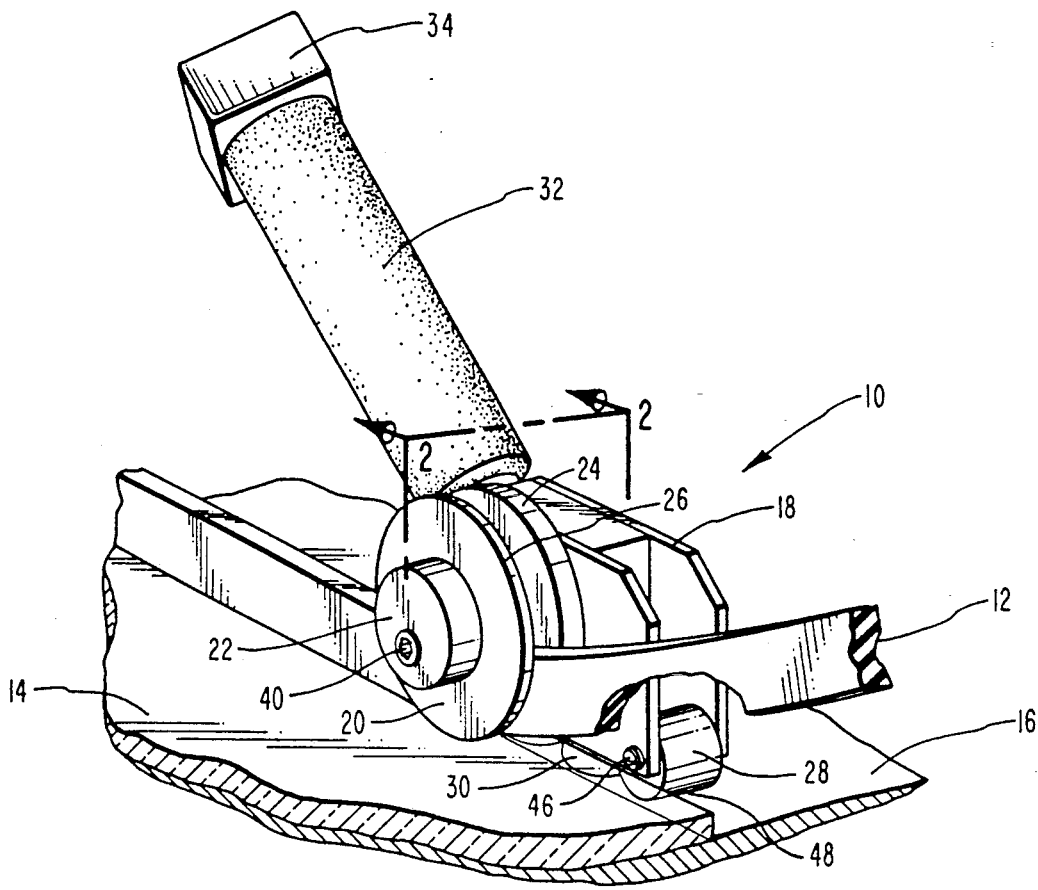
FIG. 1 is a perspective view of the applicator tool of the present invention as it would be used in mounting a piece of insulating strip to a window positioned on a flat surface.

Reference is now made to the figures wherein like parts are referred to by like numerals throughout. With particular reference to FIG. 1, an applicator tool according to the present invention is generally designated at 10. The applicator tool 10 is illustrated as it would be used to apply an insulating strip 12 to a pane of glass 14 which is resting on a table 16.

As used herein, "insulating strip" and "flexible adhesive strip" encompass those materials which are employed as a separator or spacer, desiccant, and/or sealer in the manufacture of multi-pane windows. One example of an insulating strip which can be applied with the tool of the present invention, is a product marketed by Tremco, Inc. under the trade name SWIGGLE STRIP®. It will be appreciated, however, that the present invention may be effectively employed in the application of a variety of materials to various planar surfaces.

Still referring to FIG. 1, the applicator tool 10 includes a frame 18 to which a directing roller 20 is axially mounted. The directing roller 20 is mounted to the frame 18 by means of an eccentric disk 22, as will be explained in greater detail below. The directing roller 20 is axially mounted to maintain rolling contact along the surface of the glass. In contrast to many prior art devices which employ contact points which slide along the surface of the glass, the directing roller of the present invention assists in reducing the risk that any coatings which have been applied to the surface of the glass will be damaged during application of the insulating strip.

The directing roller 20 comprises a first flange 24 and a second flange 26. When applying insulating strip 12 to glass 14, the insulating strip 12 is directed between the first flange 24 and the second flange 26. The tool is then directed along the edge of the glass 14.

To minimize friction as the tool is directed along the edge of the glass, transport rollers 28 are mounted to the frame 18. Thus, when the glass 14 is placed upon a table 16, transport rollers 28 are in contact with the table as the insulating strip is applied.

Guiding rollers 30 are also mounted to the frame 18. The guiding rollers 30 ensure that as the insulating strip is applied to the glass the tool 10 stays at a uniform distance from the edge of the glass.

The applicator tool 10 further includes a handle 32 for operator to grasp. Attached to the handle 32 is a rectangular block 34 which is used when forming a corner with the insulating strip, as is explained further below.

The rollers employed in the present invention are preferably constructed of a non-stick plastic material, such as TEFLON. The body of the tool may made of soft aluminum. However, as will be appreciated by one skilled in the art, a variety of materials may be used in the construction of an applicator tool according to the teachings of the present invention.

Figure 2:
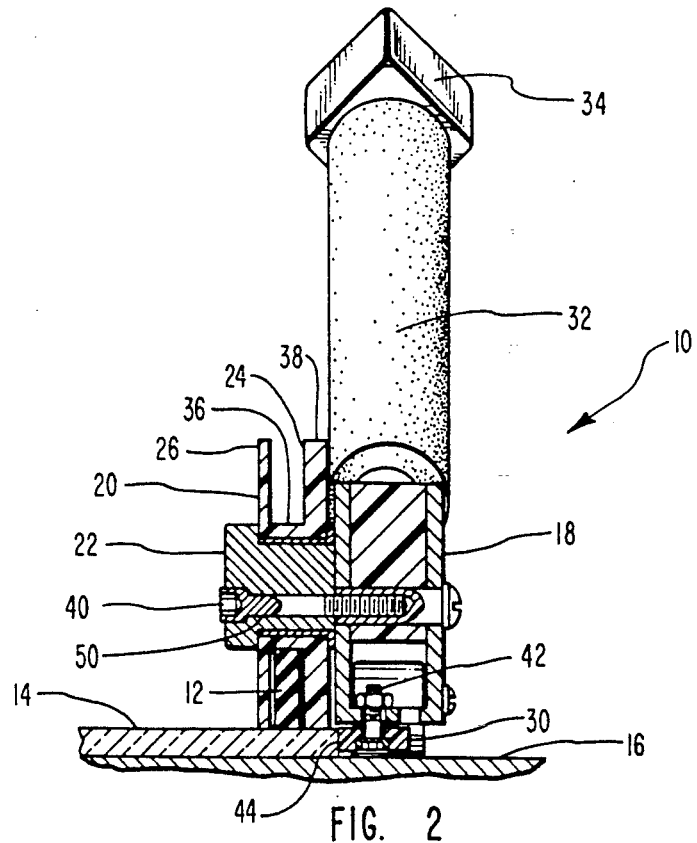
FIG. 2 is a cross-sectional view taken along lines 2—2 of FIG. 1.

With reference now to FIG. 2, it can be seen that the directing roller 20 further comprises a cylindrical axis 36. The cylindrical axis 36 is configured such that the height of the flanges 24 and 26—that distance between the exterior 38 of flanges 24 and 26 and the exterior of the cylindrical axis 36 —is approximately equal to the height of the insulating strip 12. Preferably, the height of the flanges 24 and 26 is slightly less than the height of the insulating strip 12; thus, as the insulating strip 12 is applied to the glass 14, the cylindrical axis 36 applies a force to the insulating strip to firmly secure it to the glass.

Insulating strips are made in a variety of heights to correspond to the different thickness of multi-pane windows. Thus, to accommodate a variety of heights of insulating strips, the directing roller 20 is mounted onto the frame with a directing roller mounting screw 40. By unscrewing the directing roller mounting screw 40, the directing roller 20 may be quickly and easily removed and replaced with a directing roller having a different flange height.

As best seen in FIG. 2, the flanges 24 and 26 of directing roller 20 are of differing thicknesses. The thickness of the flange on the side closest to the frame 18 partially determines how far from the edge of the glass the insulating strip will be applied. Thus, if it is desired that the insulating strip be applied closer to the edge of the glass, the directing roller 20 may be removed from the frame, rotated and attached to the frame with first flange 24 closest to the frame.

Guiding roller 30 is mounted to the frame 18 with a guiding roller mounting screw 42. Guiding roller 30 is axially mounted onto the frame such that it is capable of rolling contact with the edge 44 of the glass 14.

As will be noted by reference to FIGS. 1 and 2, guiding roller 30 may be configured such that it does not extend below transport rollers 28. Thus, when an insulating strip is applied to a pane of glass which is resting on a table, there is some clearance between the guiding rollers 30 and the table 16.

Referring again to FIG. 1, transport rollers 28 are mounted to the frame 18 with axial screws 46. The axial screws 46 permit the transport rollers 28 to rotate as the tool is run along the edge of the glass 14.

When mounting the insulating strip upon a piece of glass which is resting upon a table, the tool must be adjusted so that the distance between the contacting surface 48 of the transport roller and the exterior 38 of the flanges contacting the glass is equal to the thickness of the glass 14. This adjustment is accomplished by employing an adjustable mounting means.

One such adjustable mounting means is illustrated in FIGS. 1 and 2 as comprising an eccentric disk 22 in combination with the directing roller 20. By adjusting the vertical positioning of the directing roller, the distance between the contacting surface 48 of the transport roller and the exterior 38 of the flanges contacting the glass is altered.

By loosening directing roller mounting screw 40, the eccentric disk 22 is free to rotate about the screw. The eccentric disk 22 is configured with its axis 50 off center from the geometrical center of the disk. Thus, as eccentric disk 22 is rotated about axis 50, the geometrical center of the eccentric disk 22 changes position, most notably in the vertical direction.

The directing roller 20 rotates about the geometrical center of eccentric disk 22. Thus, by rotating the eccentric disk about axis 50, the vertical positioning of directing roller 20 may be adjusted.

When adjusting the tool for use on a piece of glass, the tool may be set against the edge of the glass with the transport rollers 28 in contact with the table upon which the glass is resting. Directing roller mounting screw 40 may then be loosened and eccentric disk 22 rotated about screw 40 until the exterior 38 of the flanges is in contact with the top surface of the glass 14. The directing roller mounting screw 40 may then be tightened and the tool 10 is ready for use.

Figure 3:
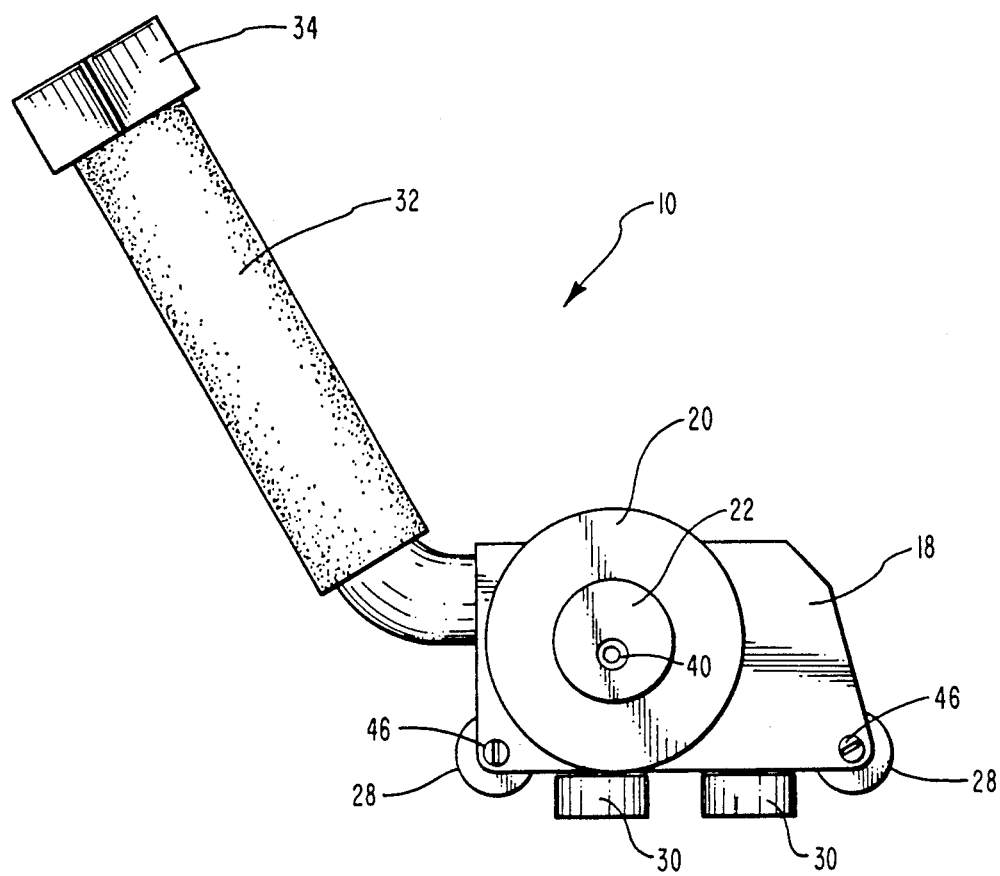
FIG. 3 is a side view of the applicator tool illustrated in FIG. 1 showing one of the plurality of positions in which the directing wheel may be mounted.
Figure 4:
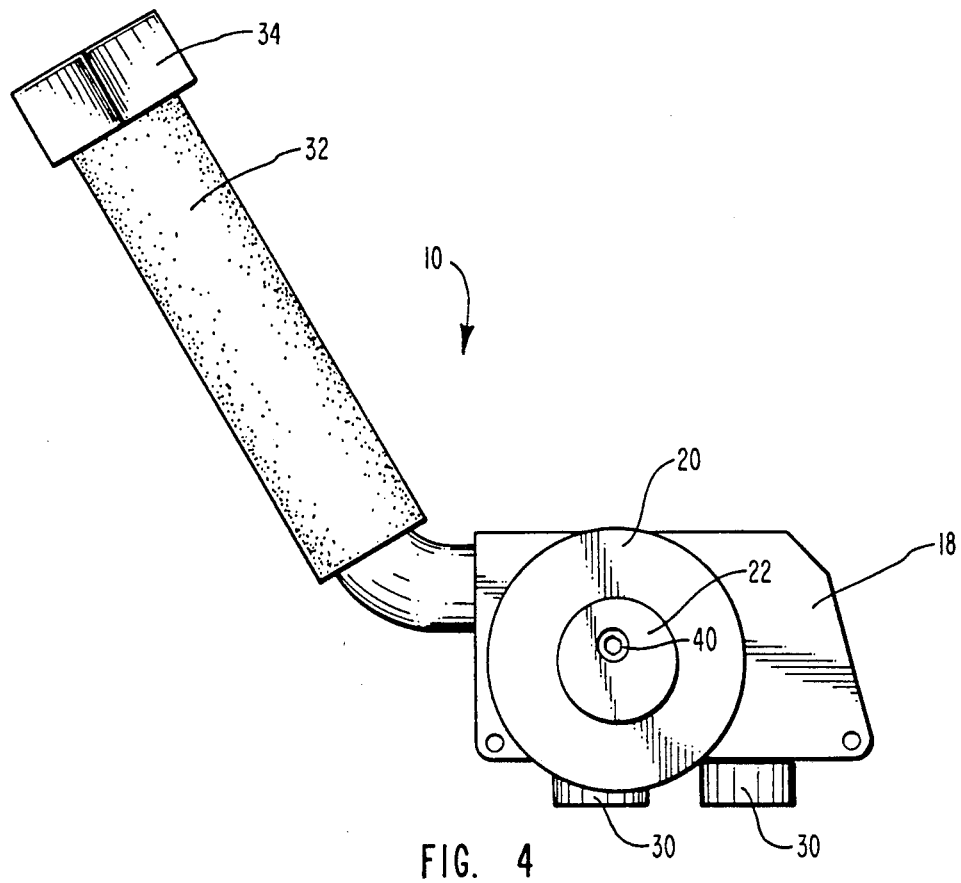
FIG. 4 is a also a side view of the applicator tool illustrated in FIG. 1 showing a second position in which the directing wheel may be mounted.

For example, FIGS. 3 and 4 illustrate the applicator tool 10 with the directing roller 20 adjusted in two different positions. In FIG. 3 the eccentric disk 22 is positioned such that the directing roller 20 is in its highest position. By rotating the eccentric disk 22 180 degrees, the directing roller 20 is placed in its lowest position, as illustrated in FIG. 4.

It will be appreciated that the adjustable mounting means may comprise a variety of other mechanisms. By way of example, and not by limitation, the adjustable mounting means may include a slot configured into the frame on an angle to the horizontal. With the directing roller mounting screw 40 mounted through this slot, the directing roller could be positioned at the position along the angled slot corresponding to the desired vertical position of the directing roller.

As mentioned above, guiding rollers 30 are provided to position the tool with respect to the edge of the glass, thereby ensuring that the insulating strip is directed onto the glass a constant distance from the edge of the glass. Two guiding rollers 30 are preferably provided, as illustrated in FIG. 3, to provide stability against the edge of the glass. It will be appreciated, however, that the present invention may be utilized with more or less than two guide rollers.

Because guiding rollers 30 can be easily removed from the frame 18 by removing guiding roller mounting screws 42 (FIG. 2), they may be replaced with guiding rollers having a variety of lengths. For example, if the insulating strip is being applied to the edge of a pane of glass which is not resting on a table top, it is preferable that the guiding rollers extend below the pane of glass, as illustrated in FIG. 3.

When insulating strip is applied to glass without the use of a mounting table 16, the transport rollers 28 play no role. In such an application, it may be desirable to remove the transport rollers from the applicator tool, as illustrated in FIG. 4.

The applicator tool, as described thus far, is useful for applying the insulating strip in straight segments along the edge of a pane of glass. When applying the insulating strip, it may become necessary to mold the insulating strip to form a corner corresponding to the corners of the glass upon which the insulating strip is being applied.

Figure 5:
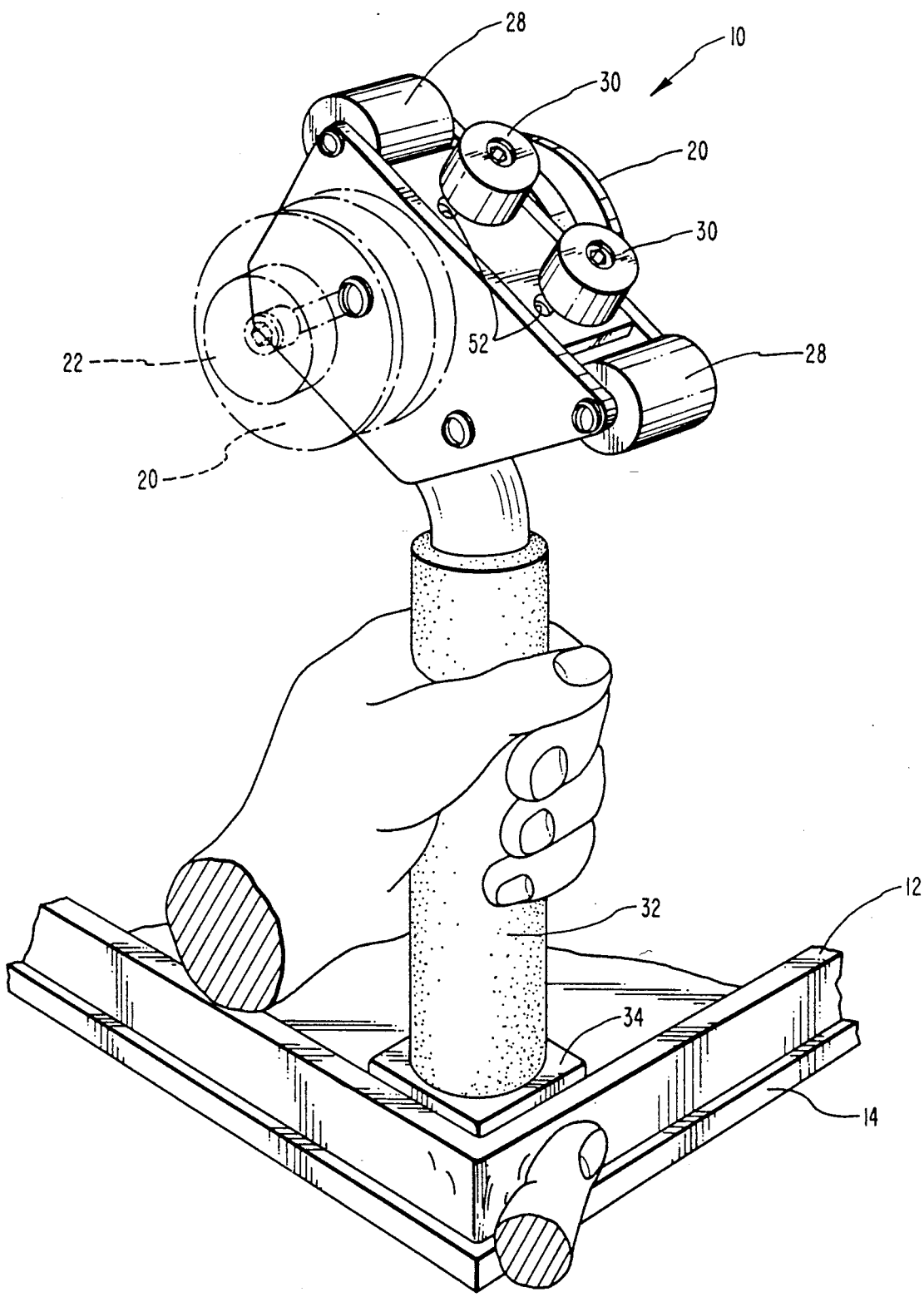
FIG. 5 is a perspective view of the applicator tool of the present invention as it would be used to mold a piece of insulating strip around the corner on a piece of glass, with phantom lines showing that the directing wheel can be mounted on either side of the frame.

For this reason, the applicator tool is configured with means for bending the insulating strip through an angle. A preferred embodiment of the bending means is illustrated in FIG. 5. The bending means comprises a rectangular block 34 which is attached to the handle 32. As illustrated in FIG. 5, the operator of the applicator tool 10 can use the rectangular block 34 to form a corner with the insulating strip 12.

One notable advantage to the inclusion of a bending means on the applicator tool is that the operator does not have to set the applicator tool aside to perform this operation. Thus, in addition to being of assistance in providing the operator with a device for forming the corner, the operator saves time in not having to set the tool aside and then pick it up again for each corner which must be formed. The tool significantly assists in preserving fluidity of motion necessary for efficient application of the insulating strip.

FIG. 5 also illustrates how the tool may be quickly adapted for use in both a right-handed and a left-handed mode. The frame 18 is configured with mounting holes 52 located on both sides of the frame. Thus, the guiding rollers 30 may be mounted on either side of the frame.

Additionally, the directing roller 20 and eccentric disk 22 may be mounted on either side of the frame, as illustrated in the phantom lines of FIG. 5. Thus, by merely mounting the guiding rollers 30 and the directing roller 20 on the appropriate side of the applicator tool, the tool may be adapted for use in either a right-handed mode or a left-handed mode.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

I claim:

1. A tool for applying a flexible adhesive strip onto the surface of an article a predetermined distance from the edge of the article, comprising:
   a frame;
   a directing roller, comprising:
      a cylindrical axis;
      a flange disposed on each side of the cylindrical axis; and
      an eccentric disk by which the directing roller is mounted to said frame, said eccentric disk configured to permit the directing roller to be mounted to the frame at any one of a plurality of positions; and
   a guide attached to the frame and configured to guide said directing roller in a direction substantially parallel to the edge of the article a predetermined distance from the edge of the article.

2. A tool for applying a flexible adhesive strip onto the surface of an article as defined in claim 1, wherein the flanges extend outwardly from the cylindrical axis of the directing roller a distance less than the height of the flexible adhesive strip.

3. A tool for applying a flexible adhesive strip onto the surface of an article as defined in claim 1, wherein the directing roller is removably mounted to the frame.

4. A tool for applying a flexible adhesive strip onto the surface of an article as defined in claim 1, wherein the flanges comprise a first flange and a second flange, the first flange configured with a thickness greater than the thickness of the second flange.

5. A tool for applying a flexible adhesive strip onto the surface of an article as defined in claim 1, wherein the guide comprises at least one guiding roller axially mounted for rotation in a direction perpendicular to the directing means.

6. A tool for applying a flexible adhesive strip onto the surface of an article as defined in claim 5, wherein each guiding roller is removably mounted to the frame.

7. A tool for applying a flexible adhesive strip onto the surface of an article as defined in claim 6, wherein each guiding roller is configured to extend below the article onto which the flexible adhesive strip is being applied.

8. A tool for applying a flexible adhesive strip onto the surface of an article as defined in claim 5, further comprising means for mounting the directing roller and the guiding roller on each side of the frame such that the tool may alternatively be used in a right-handed mode and in a left-handed mode.

9. A tool for applying a flexible adhesive strip onto the surface of an article a predetermined distance from the edge of the article, comprising:
   a frame;
   at least one directing roller, the directing roller comprising a cylindrical axis and a flange disposed on each side of the cylindrical axis;
   means attached to the frame for guiding the directing means in a direction parallel to the edge of the article a predetermined distance from the edge of the article;
   at least one contact point attached to the frame, the contact point extending to a surface on which the article may be placed, such that as the flexible adhesive is applied to the surface of the article, the contact point is in constant contact with the surface on which the article is placed; and
   an eccentric disk for mounting the directing roller to the frame of the tool such that the directing roller may be mounted to the frame of the tool at any one of a plurality of positions.

10. A tool for applying a flexible adhesive strip onto the surface of an article as defined in claim 9, wherein the contact point comprises at least one transport roller.

11. A tool for applying a flexible adhesive strip onto the surface of an article as defined in claim 9, wherein the directing roller is removably mounted to the frame.

12. A tool for applying a flexible adhesive strip onto the surface of an article as defined in claim 9, wherein the flanges comprise a first flange and a second flange, the first flange configured with a thickness greater than the thickness of the second flange.

13. A tool for applying a flexible adhesive strip onto the surface of an article as defined in claim 11, further comprising:
   a rectangular block configured for use in bending the flexible adhesive strip through an angle to change the direction of application of the flexible adhesive strip.

14. A tool for applying a flexible adhesive strip onto the surface of an article as defined in claim 13, wherein the angle is approximately ninety degrees.

15. A tool for applying a flexible adhesive strip onto the surface of an article as defined in claim 13, further comprising a handle to which the rectangular block is attached.

16. A hand-held tool for applying an insulating strip onto the surface of a pane of glass a predetermined distance from the edge of the glass, comprising:
   a frame;
   a directing roller attached to the frame for directing the flexible adhesive strip onto the surface of the glass, the directing roller comprising:
   a cylindrical axis;
   a first flange disposed on one side of the cylindrical axis; and
   a second flange disposed on the opposite side of the cylindrical axis, the first flange having a thickness greater than the thickness of the second flange, the directing roller being removably mounted to the frame with an eccentric disk such that the directing roller may be mounted to the frame in any one of a plurality of positions;
   two guiding rollers attached to the frame for guiding the directing roller in a direction parallel to the edge of the glass a predetermined distance from the edge of the glass, the guiding rollers being axially mounted for rotation in a direction perpendicular to the direction of rotation of the directing roller; and
   two transport rollers removably mounted to the frame and configured to extend to a surface on which the pane of glass may be placed, such that as the insulating strip is applied to the surface of the pane of glass, the transport rollers are in constant contact with the surface on which the pane of glass is placed;
   a handle; and
   a rectangular block attached to the handle configured for use in bending the insulating strip through a ninety degree angle to change the direction of application of the insulating strip.

17. A hand-held tool for applying an insulating strip onto the surface of a pane of glass as defined in claim 16, further comprising mounting holes for the directing roller and the guiding rollers on each side of the frame such that the tool may alternatively be used in a right-handed mode and in a left-handed mode.

* * * * *